Dec. 31, 1940.                    S. HUNT                    2,226,932
DETECTOR CIRCUIT
Filed Oct. 8, 1938
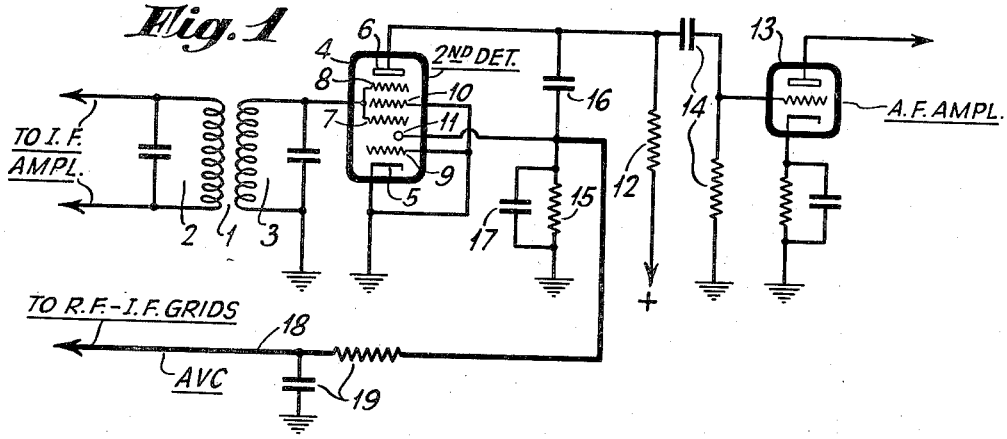
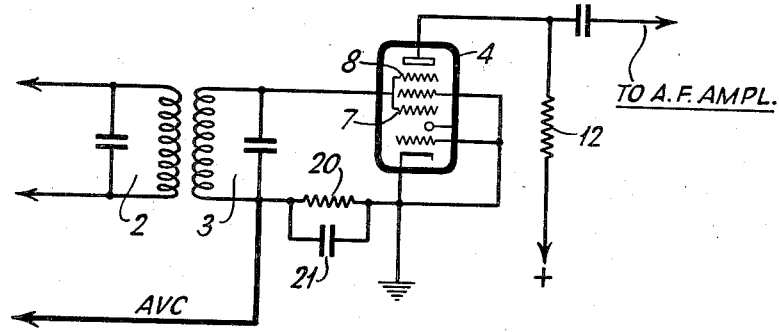
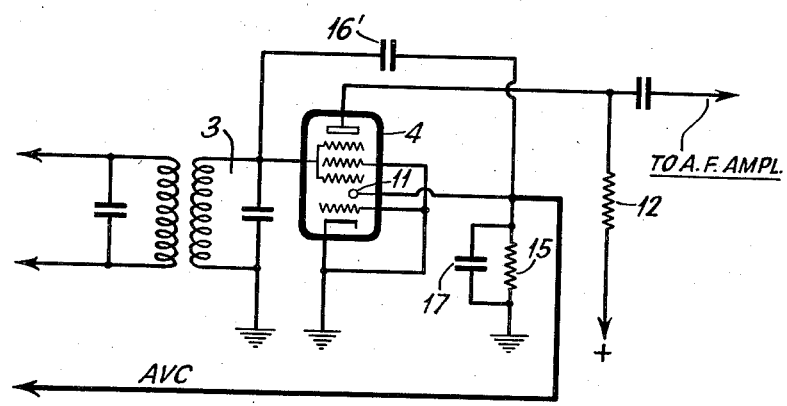
INVENTOR.
SEYMOUR HUNT
BY
ATTORNEY.

Patented Dec. 31, 1940

2,226,932

UNITED STATES PATENT OFFICE 2,226,932

DETECTOR CIRCUIT

Seymour Hunt, Jackson Heights, N. Y., assignor to Radio Corporation of America, a corporation of Delaware Application October 8, 1938, Serial No. 233,905

2 Claims. (Cl. 250—27)

My present invention relates to detector circuits, and more particularly to linear detectors having substantial gain at audio and carrier frequencies.

One of the main objects of this invention is to provide a linear detector wherein a cold electrode cooperates with a cathode to provide a means for attracting electrons to a highly positive plate solely during the positive half cycles of incoming signal waves.

Another important object of my invention is to provide such a linear detector with gain by utilizing acceleration electrodes in the electron stream between cathode and the input cold electrode, as well as between the plate and the latter.

Still other objects of my invention are to improve generally the construction of linear detectors having gain, and more especially to provide such detectors in reliable and efficient manner.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 illustrates a detector circuit employing the invention,

Figs. 2 and 3 show two modifications in the AVC circuit of the detector.

Referring now to the accompanying drawing, wherein like reference characters in the different figures designate similar circuit elements, there is only shown that portion of a superheterodyne receiver which is important to a proper understanding of the invention. Of course, the detection network may be employed in any other type of receiver, as, for example, a tuned radio frequency receiver. Since the networks of a superheterodyne receiver prior to the second detector are well known, there is merely shown the I. F. transformer 1 whose primary and secondary circuits 2, 3 are each resonated to the I. F. value. The latter may be chosen from a range of 75 to 450 kc. The second detector embodies a tube of the 6A7 or 6A8 types; such a tube is of the pentagrid type and is represented by the numeral 4. The tube has a cathode 5, a plate 6, and four grids which are arranged in succession in the electron stream flowing between cathode and plate.

Grids 7 and 8 are strapped together and are connected to the high potential side of the input circuit 3; the cathode 5 is at ground potential, as is the low potential side of the input circuit 3. The grid 9, adjacent the cathode, is connected to ground, while the third grid 10, disposed between grids 7—8, is also grounded. The electrode 11, which is actually a rod, function as the anode of a diode rectifier for producing AVC bias. The plate 6 is connected to a positive potential point, of approximately +250 volts, of a current source (not shown); the plate circuit includes the load resistor 12 having a magnitude of approximately 0.5 megohms. The audio voltage developed across resistor 12 is transmitted to the following audio amplifier 13 by the coupling elements 14. The amplified audio voltage may be utilized by any desired type of reproducer.

The AVC bias may be provided by feeding the amplified carrier energy to the diode rectifier comprising anode 11, cathode 5 and load resistor 15. The condenser 16 has a low impedance to currents of I. F. carrier frequency, and is connected from plate 6 to anode 11. The load resistor, connected to ground from anode 11, has developed across it a direct current voltage whose magnitude varies directly with the amplified I. F. carrier amplitude. The I. F. bypass condenser 17 shunts resistor 15, and lead 18 functions as the path for impressing the direct current voltage across resistor 15 upon the signal grids of the signal transmission tubes feeding the detector. Such prior tubes can be the tunable radio frequency amplifiers, the first detector and one or more of the I. F. amplifiers. The AVC circuit includes filter network 19 for suppressing pulsating voltage components in the AVC bias. The AVC circuit functions to vary the amplification of the pre-second detector tubes in a sense to maintain the I. F. carrier amplitude at the input circuit 3 substantially constant over a wide range of carrier variation at the signal collector.

Considering, now, the operation of the detector, let it be assumed that grids 9 and 10 are free. In this state of the detector tube no plate current flows unless the electrodes 7—8 are at a positive potential with respect to the cathode. Hence, when the electrodes 7—8 are zero, or negative, in potential no plate current flows. This means that the tube 4 then functions as a rectifier, because plate current only flows during positive half cycles of the input waves. Since the electrodes 7 and 8 consist of open mesh, or are open wire cylinders, electrons which are attracted by these electrodes pass through the openings of the electrodes to the plate 6. Thus, the current which electrodes 7—8 draw from the input circuit may be kept low and the input impedance comparably high. It will be observed that during the positive half cycle the voltage of electrodes 7—8 is sufficiently positive to attract the electrons close thereto. Since the plate potential is considerably higher than that of electrodes 7—8, the electrons come under the influence of the plate and are attracted into the plate circuit. The voltage developed across resistor 12 by the plate current flow therethrough may be made to be substantially larger than the applied input voltage by choosing a sufficiently higher $G_m$ between plate 6 and electrodes 7—8. If the magnitude of resistor 12 is high (of the order of 0.5 megohms) the plate voltage across the resistor bears a linear relation to the input voltage. In this way there is provided a linear detector having gain.

Now, if the third grid 10 is grounded, the voltage across resistor 12 per applied input volts may be increased; that is to say, the gain of the detector is increased. The explanation for this action may be stated to be as follows. When electrodes 7—8 are positive, a virtual cathode is established between grids 7 and 10. This virtual cathode varies in intensity, and is equivalent to placing an input voltage in the cathode circuit. Another way of viewing the action is to consider grid 10 as accelerating the electrons towards the plate 6, since the grid 10 is positive with respect to the virtual cathode. The positive potential on grid 10 is provided by contact potential, and also by the potential difference between plate 6, grid 10 and the cathode.

Still further gain may be had by grounding the first grid 9. Contact potential, as well as the potential difference between plate 6, grid 9 and cathode, establishes grid 9 at a positive potential with no input signal. The slightly positive grid 9 (approximately 1 volt) draws electrons from the cathode 5; the electrons pass through the mesh of grid 9 and accumulate between electrode 7 and grid 9. This produces a virtual cathode state. The positive potential on electrodes 7—8 attracts electrons so that plate 6 can then attract the electrons. Hence, it will be seen that each of the grounded electrodes acts to draw electrons towards the plate 6. The total effect is an increased audio voltage across load resistor 12; the relation between input voltage and the latter being substantially linear.

The detector amplifies the I. F. carrier amplitude or AVC action in Fig. 1. It is, also, possible to derive AVC bias from a resistor 20 connected between the low potential end of input circuit 3 and the grounded cathode. This is shown in Fig. 2. An I. F. bypass condenser 21 is conected across the resistor 20. Upon the electrodes 7—8 assuming a positive potential, current flows through resistor 20 developing a direct current voltage thereacross for use as AVC bias. The electrode 11 is left free in such case. Otherwise the detector circuit functions as in Fig. 1.

The arrangement in Fig. 3 differs from that in Fig. 1 only in that the I. F. carrier energy is applied to diode anode 11 through condenser 16'. The latter is connected between the high potential side of input circuit 3 and the anode 11. The detector operation is otherwise the same as explained previously in connection with Fig. 1.

While I have indicated and described several systems for carrying my invention into effect, it will be apparent to one skilled in the art that my invention is by no means limited to the particular organization shown and described, but that many modifications may be made without departing from the scope of my invention, as set forth in the appended claims.

What I claim is:

1. In a detector network, a tube having a cathode, plate and at least three grids arranged in succession in the electron stream between the cathode and plate, a signal input circuit connected between the second grid from the cathode and the latter, means connecting the first and third grids from the cathode directly to the latter whereby they are at the same direct current potential as the cathode, and a load impedance connected to the plate.

2. In a detector network, a tube having a cathode, plate and at least three grids arranged in succession in the electron stream between the cathode and plate, a signal input circuit connected between the second grid from the cathode and the latter, means connecting the first and third grids from the cathode to the latter, and a load impedance connected to the plate, a fourth grid in the tube adjacent the plate, said second and fourth grids being at the same direct current potential.

SEYMOUR HUNT.